United States Patent
Rajgopal et al.

(10) Patent No.: US 11,886,358 B2
(45) Date of Patent: *Jan. 30, 2024

(54) BALL GRID ARRAY STORAGE FOR A MEMORY SUB-SYSTEM

(71) Applicant: Micron Technology, Inc., Boise, ID (US)

(72) Inventors: Suresh Rajgopal, San Diego, CA (US); Balint Fleischer, Groton, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,452

(22) Filed: Apr. 11, 2022

(65) Prior Publication Data

US 2022/0237131 A1 Jul. 28, 2022

Related U.S. Application Data

(63) Continuation of application No. 17/127,289, filed on Dec. 18, 2020, now Pat. No. 11,301,401.

(51) Int. Cl.
| | |
|---|---|
| *G06F 13/12* | (2006.01) |
| *G06F 13/16* | (2006.01) |
| *G06F 13/42* | (2006.01) |
| *G06F 12/06* | (2006.01) |
| *G06F 12/02* | (2006.01) |
| *G06F 13/40* | (2006.01) |

(52) U.S. Cl.
CPC ...... *G06F 13/1668* (2013.01); *G06F 12/0246* (2013.01); *G06F 12/063* (2013.01); *G06F 13/4068* (2013.01); *G06F 13/4221* (2013.01)

(58) Field of Classification Search
CPC ............ G06F 13/1668; H01L 2924/00; H01L 2924/0012; H01L 2924/0014
USPC .......................................................... 711/154
See application file for complete search history.

(56) References Cited

U.S. PATENT DOCUMENTS

| | | | |
|---|---|---|---|
| 6,818,978 B1 | 11/2004 | Fan | |
| 6,933,176 B1 | 8/2005 | Kirloskar | |
| 7,705,850 B1 * | 4/2010 | Tsu | ............... G06F 13/28 710/36 |
| 7,793,029 B1 * | 9/2010 | Parson | ............... G06F 13/385 710/316 |
| 8,021,927 B2 | 9/2011 | Khan | |
| 8,549,205 B1 * | 10/2013 | Harriman | ............... G06F 13/4295 370/254 |
| 2008/0052451 A1 * | 2/2008 | Pua | ............... G06F 13/385 711/E12.008 |
| 2008/0116544 A1 * | 5/2008 | Grinman | ............... H01L 23/3128 257/659 |
| 2009/0193184 A1 * | 7/2009 | Yu | ............... G06F 12/0246 711/E12.001 |

(Continued)

*Primary Examiner* — Titus Wong

(74) *Attorney, Agent, or Firm* — Brooks, Cameron & Huebsch, PLLC

(57) ABSTRACT

An apparatus includes a memory component having a plurality of ball grid array (BGA) components, wherein each respective one of the BGA components includes a plurality of memory blocks and a BGA component controller and firmware adjacent the plurality of memory blocks to manage the plurality of memory blocks. The apparatus further includes a processing device, included in the memory component, to perform memory operations on the BGA components.

20 Claims, 5 Drawing Sheets

(56) References Cited

U.S. PATENT DOCUMENTS

| | | | | |
|---|---|---|---|---|
| 2011/0258373 A1* | 10/2011 | Miura | ............ | G11C 11/4072 |
| | | | | 711/E12.078 |
| 2013/0121074 A1* | 5/2013 | Sugita | ............ | G11C 5/063 |
| | | | | 365/185.08 |
| 2014/0281151 A1* | 9/2014 | Yu | ............ | G06F 11/3058 |
| | | | | 711/103 |
| 2015/0347032 A1* | 12/2015 | Muraoka | ............ | G11C 7/10 |
| | | | | 711/154 |

* cited by examiner

BALL GRID ARRAY STORAGE FOR A MEMORY SUB-SYSTEM

PRIORITY INFORMATION

This application is a Continuation of U.S. application Ser. No. 17/127,289, filed on Dec. 18, 2020, the contents of which are incorporated herein by reference.

TECHNICAL FIELD

Embodiments of the disclosure relate generally to memory sub-systems, and more specifically, relate to ball grid array storage for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
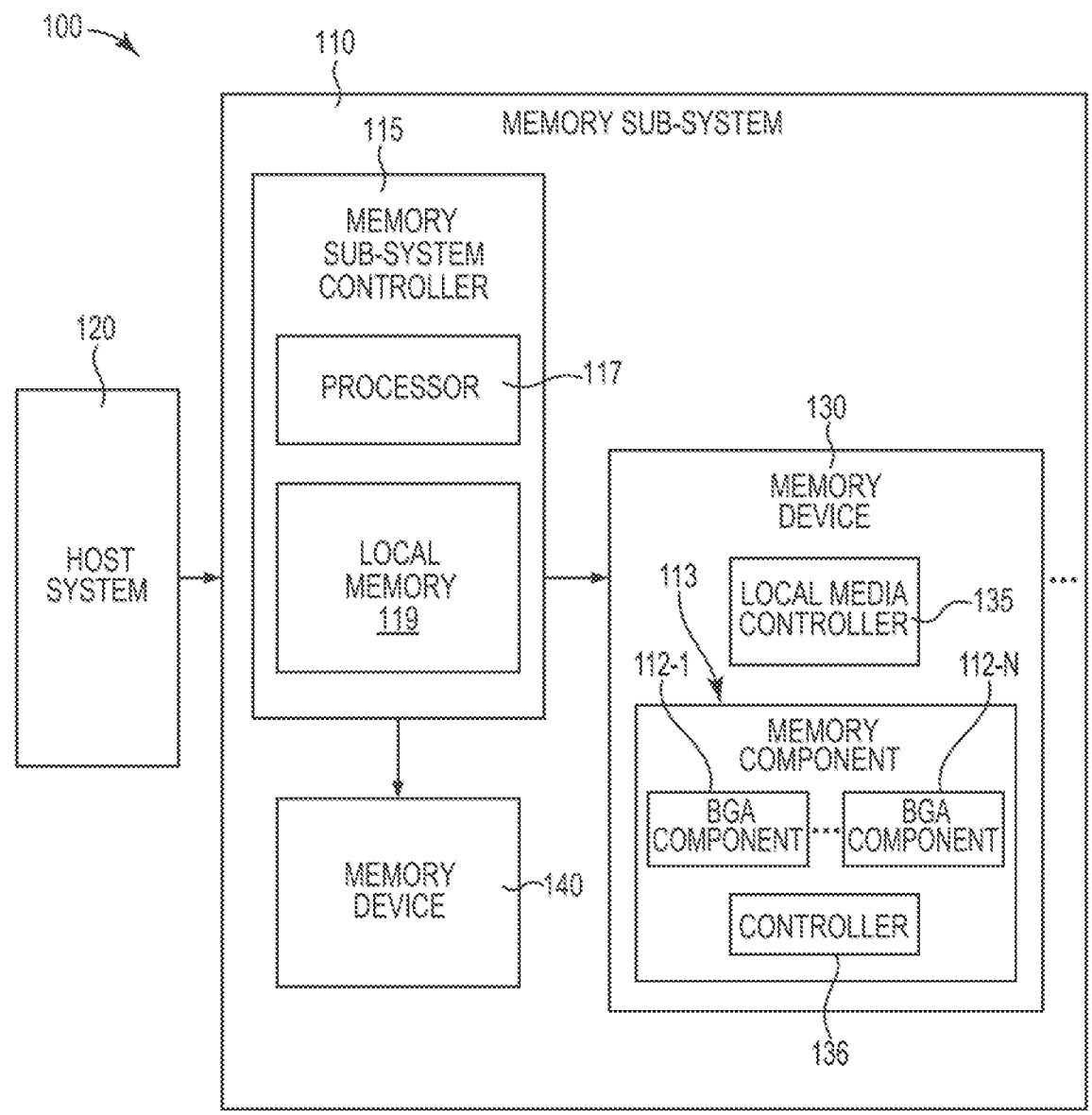
FIG. 1 illustrates an example computing environment that includes a memory sub-system in accordance with some embodiments of the present disclosure.

Aspects of the present disclosure are directed to ball grid array storage for a memory sub-system, in particular to memory sub-systems that include a plurality of ball grid array (BGA) components. A memory sub-system can be a storage device, a memory module, or a hybrid of a storage device and a memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include memory devices that store a large amount of data (e.g., greater than one hundred (100) terabytes (TB) of data). Some memory sub-systems can have a high throughput (e.g., fifty (50) to 100 gigabytes per second (GB/s)). However, a memory sub-system that can store a large amount of data might not have a high bandwidth. As used herein, the term "bandwidth" can refer to the maximum amount of data that can be transferred within a certain amount of time. For example, a flash memory device might be a high storage capacity flash memory device that can store a large amount of data but does not necessarily have bandwidth that scales with capacity.

A high storage capacity memory device may not have a high bandwidth due to the interface of the memory device and the path through which the data travels. As used herein, the term "interface" can refer to a shared boundary across which two or more separate components of a computer system exchange information. Peripheral component interconnect express (PCIe) is an interface standard for connecting components of a computer system. The version (e.g., generation) of the interface and the amount of input/output (I/O) lanes connected to the interface can determine the bandwidth of a memory device. As used herein, the term "I/O lane" can refer to a wire connected to one or more interfaces to transfer data between the one or more interfaces.

The path through which the data travels can affect the bandwidth of the memory sub-system. For example, data can travel through different memory components and interfaces within a memory sub-system. Travelling through the different components and interfaces can decrease the speed at which the data is transferred because the data can travel through a memory component at a lower rate than it travels through an interface. Further, the different interfaces that the data can travel through can have different bandwidths. Travelling through the different memory components and interfaces can decrease the net bandwidth of a memory sub-system. As used herein, a "net bandwidth" can refer to the amount of data that was transferred over a certain amount of time as the data travelled from a starting memory device to a destination memory device.

Further, the storage capacity of memory devices can increase at a faster rate than the bandwidth of the interfaces coupled to the memory devices. This can lead to a certain amount of storage in a high capacity memory being less utilized because the data cannot be accessed fast enough to make use of the full storage capacity of the memory device. The bandwidth limitation can result in using memory devices with less capacity to avoid building unusable memory into a memory sub-system.

Some conventional approaches attempt to increase the net bandwidth of a memory sub-system and decrease the amount of unusable storage capacity by adding memory devices, such as, for instance, additional negative-and (NAND) memory devices, to the memory sub-system. Although such approaches can improve the net bandwidth of a memory sub-system, the additional NAND memory devices occupy space within the memory sub-system. Any space occupied by additional NAND memory devices decreases the amount of space available within the memory sub-system to implement memory components that perform different functions. The additional NAND memory devices can also cause the memory sub-system to consume additional power. Occupying the additional space and consuming additional power are undesirable because that results in memory sub-systems that are bigger and use more power to function as intended.

Aspects of the present disclosure address the above and other deficiencies by incorporating a plurality of ball grid array (BGA) components (e.g., ball grid array solid-state drive (BGA SSD) components) into a memory sub-system. For instance, incorporating BGA components into a memory sub-system in accordance with the present disclosure can increase both the bandwidth and storage capacity of the memory sub-system without increasing the size or power consumption of the memory sub-system. As used herein, the term "BGA component" refers to a memory component that includes memory, such as NAND flash memory and DRAM memory, firmware, and a controller chip all in a single package. For example, in some embodiments, a plurality of BGA components within a memory device of a memory sub-system can be coupled to a controller configured to perform operations on data stored in the plurality of BGA components.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

An example of non-volatile memory devices (e.g., memory device 130) includes negative-and (NAND) type flash memory. Each of the memory devices 130 can include one or more arrays of memory cells. The memory cells can include single level cells (SLCs) that can store one bit per cell, multi-level cells (MLCs) that can store two bits per cell, triple level cells (TLCs) that can store three bits per cell, quad-level cells (QLCs) that can store four bits per cell, and/or penta-level cells (PLCs) that can store five bits per cell, among others. As used herein, the term multiple level cells is used to refer to cells configured to store more than one bit per cell (e.g., MLC, TLC, QLC, PLC, etc.). In some embodiments, a particular memory component can include an SLC portion, and an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory device 130 as well as convert responses associated with the memory device 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a memory component 113. The memory component 113 can include various circuitry to facilitate storing a large amount of data (e.g., greater than 100 TB of data) in memory device 130 with a high bandwidth (e.g., 50-100 GB/s). In some embodiments, the memory component 113 can include multiple BGA components 112-1, . . . , 112-N (individually or collectively referred to as BGA component 112) to store data and a processing device (e.g., controller) 136 to manage the BGA components 112.

In some embodiments, the memory the memory device 130 includes at least a portion of the memory component 113. Further, the memory device 130 can include a local media controller 135 configured to execute instructions for performing the operations described herein. In some embodiments, the memory component 113 is part of the host system 110, an application, or an operating system.

In a non-limiting example, an apparatus (e.g., memory sub-system 110) can include a memory component 113. The memory component 113 can be resident on the memory device 130. As used herein, the term "resident on" refers to something that is physically located on a particular component. For example, the memory component 113 being "resident on" the memory device 130 refers to a condition in which the hardware circuitry that comprises the memory component 113 is physically located on the memory device 130. The term "resident on" can be used interchangeably with other terms such as "deployed on" or "located on," herein.

Figure 2:
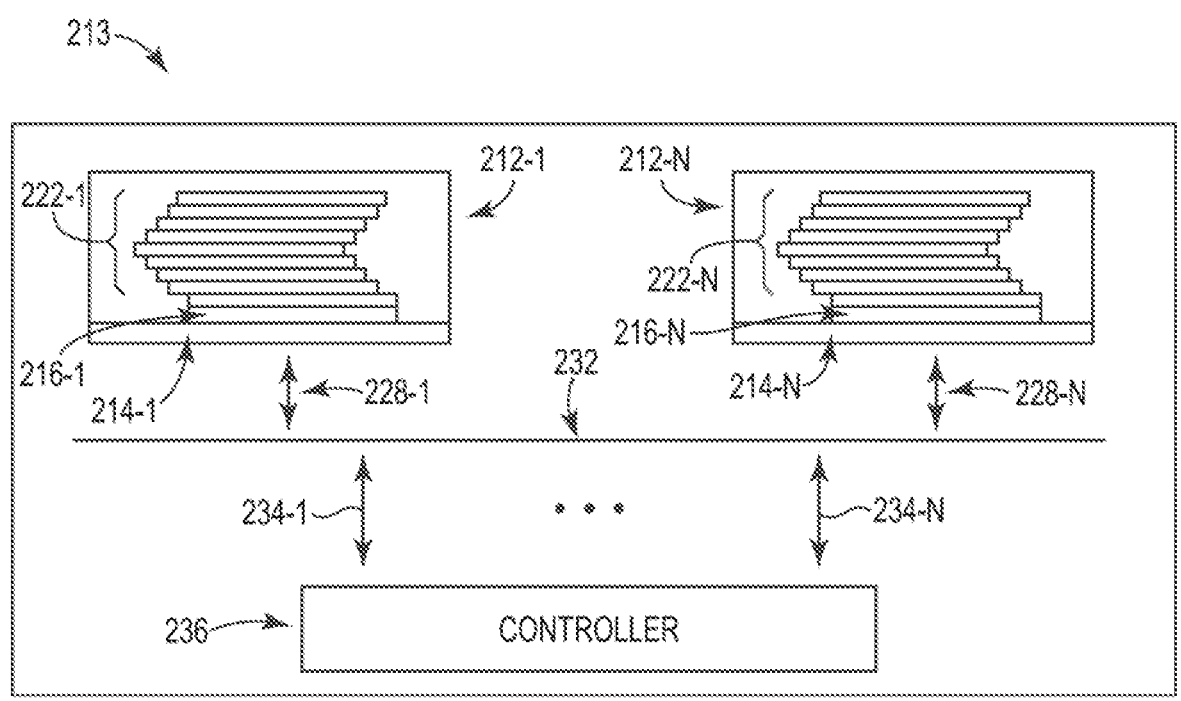
FIG. 2 is a block diagram of an example ball grid array storage for a memory sub-system in accordance with some embodiments of the present disclosure.

The memory sub-system 110 (e.g., memory device 130) can include a memory component 113 having a plurality of BGA components 112-1, . . . , 112-N (individually or collectively referred to as BGA components 112), wherein each respective one of the BGA components 112 includes a plurality of NAND memory blocks (e.g., NAND memory blocks 222-1, . . . , 221-N shown in FIG. 2) a BGA component controller (e.g., BGA component controller 216-1, . . . , 216-N shown in FIG. 2), and firmware adjacent the plurality of NAND memory blocks to manage the plurality of NAND memory blocks. In some embodiments, the BGA component controller of each respective one of the BGA components 112 can manage each respective NAND memory block in that respective BGA component 112 independently. For example, the BGA component controller of a BGA component 112 can execute instructions to transfer data to and from one or more of the plurality of NAND memory blocks of that BGA component without transferring data to and from the other NAND memory blocks of that BGA component.

A processing device (e.g., controller) 136 is included in the memory component 113 to perform memory operations on the BGA components 112 (e.g., on the data stored in the BGA components 112). The memory operations can include, for instance, compute operations performed on the data stored in BGA components 112 (e.g., in the blocks of the BGA components). The processing device 136 can be coupled to the BGA components 112 via an interface. For example, the interface can include a plurality of processing device and BGA component input/output (I/O) lanes to couple the BGA components 112 to processing device 136. In some embodiments, the processing device 136 can be coupled to the interface using the same number of processing device I/O lanes as the number of BGA component I/O lanes used to couple the BGA components 112 to the interface.

A controller (e.g., memory sub-system controller) 115 can be operatively coupled with the memory component 113 to manage data transferred between a host (e.g., host system) 120 and the plurality of BGA components 112. In some embodiments, the controller 115 can perform host request operations corresponding to requests from the host 120, wherein the host request operations are different than the memory operations performed by the processing device 136. In some embodiments, memory operations to manage the BGA components 112 can be performed on the BGA components 112 while operations for fulfilling the host request can be performed on the processing device 136. In some embodiments, the processing device 136 and the plurality of BGA components 112 can be on the same memory chip. In some embodiments, the processing device 136 and the plurality of BGA components 112 are on different memory chips. Further, the controller 115 can receive a request from the host 120 to perform a memory operation on the BGA components 112. The memory operation can be performed on BGA components 112 by processing device 136, and the results of the memory operation can be transferred (e.g., sent) from processing device 136 to the controller 115, which can transfer the results of the operation to the host 120.

FIG. 2 is a block diagram of an example BGA storage for a memory sub-system (e.g., memory sub-system 110 of FIG. 1) in accordance with some embodiments of the present disclosure. The memory sub-system includes a memory component 213 having a plurality of BGA components 212-1, . . . , 212-N (BGA components 212). Each of the BGA components 212 can include a plurality of memory blocks 222-1, . . . , 222-N (collectively or individually referred to as plurality of memory blocks 222) a BGA component controller 216-1, . . . , 216-N (individually or collectively referred to as BGA component controller 216), and firmware adjacent (e.g., underneath) the plurality of memory blocks 222 to manage the plurality of memory blocks 222 (e.g., BGA component 212 can include a plurality of memory blocks 222-1, a BGA component controller 216-1, and firmware adjacent memory blocks 222-1, etc.). Further, each BGA component 212 can include a BGA component interface 214-1, . . . , 214-N (individually or collectively referred to as BGA component interface 214). In some embodiments, the plurality of memory blocks 222 of a respective BGA component 212 are exchangeable with memory blocks of different storage capacities. Further, the plurality of memory blocks 222 of each respective one of the BGA components 212 can comprise a plurality of vertically stacked NAND dies. A memory component 213 can also include a processing device 236 to perform memory operations on the BGA components 212. The memory component 213 includes an interface 232 to couple the BGA components 212 to the processing device 236. The BGA components 212 can be coupled to the interface 232 via a plurality of BGA component I/O lanes 228-1, . . . , 228-N (individually or collectively referred to as BGA component I/O lanes 228) and the processing device 236 can be coupled to the interface 232 via a plurality of processing device I/O lanes 234-1, . . . , 234-N (individually or collectively referred to as processing device I/O lanes 234). In some embodiments, the interface 232 is a PCIe interface.

Being able to exchange the plurality of memory blocks 222 of a BGA component 212 with memory blocks of different storage capacities can benefit the memory sub-system by increasing the scalability of the memory sub-system. As used herein, the term "scalability" refers to a memory sub-system's ability to increase or decrease in performance in response to changes in application and system processing demands. Memory sub-systems are being tasked with storing increasing amounts of data and performing increasing amounts of memory operations. Building scalable memory sub-systems is a cost-effective way to meet this increasing demand. A scalable memory sub-system allows for components within the memory sub-system to be exchanged for memory components that can meet the increased demand without unintended decreases in performance. In previous approaches, memory sub-systems that are not scalable might be replaced if the demands on the memory sub-system increase past the threshold of performance that the memory sub-system as currently constructed. However, replacing an entire memory sub-system is more time-consuming and expensive than exchanging components within a scalable memory sub-system. The scalability of the memory sub-system can be the memory sub-system's ability to store an increasing amount of data and perform an increasing amount of memory operations on that data without unintended decreases in the performance of the memory sub-system. Unintended decreases in the performance of the memory sub-system can include, at least, unintended decreases in bandwidth and/or storage capacity.

Exchanging at least one of the plurality of memory blocks 222 with at least one of a memory block with a higher storage capacity can increase the scalability of the memory sub-system. For example, exchanging at least one the plurality of memory blocks 222 with at least one of a memory block with a higher storage capacity can increase the storage capacity of that BGA component 212 without causing an unintended decrease in the performance of the memory sub-system. Exchanging multiple of the plurality of memory blocks 222 in each of the BGA components 222 can result in a significant increase in storage capacity in the memory sub-system without causing an unintended decrease in performance of the memory sub-system.

Increasing BGA component I/O lanes 228 of the BGA component interfaces 214 can also increase the scalability of the memory sub-system. For example, increasing the BGA component I/O lanes 228 of each of the BGA component interfaces 214 from one BGA component I/O lane 228 to two BGA component I/O lanes 228 can increase the scalability of the memory sub-system because the increased amount of BGA component I/O lanes 228 can increase the amount of data that can be transferred from the BGA components 212 to the processing device 236 within a certain period of time. This increased capacity to transfer data can allow a memory sub-system to meet increased demand for data transfers within the memory sub-system without unintended decreases in performance.

Each one of the respective BGA components 212 (e.g., the BGA component interface 214 of each respective BGA component 212) can include a plurality of channels to couple the plurality of memory blocks 222 of that respective BGA component 212 to the BGA component interface 214. The bandwidth of the channels can depend on, at least, the type of interface (e.g., BGA component interface 214), the generation of the interface, and the number of I/O lanes (e.g., BGA component I/O lanes 228) of the interface. For example, the type of interface can be a PCIe interface (e.g., a generation four (4) or generation five (5) PCIe interface), and the number of I/O lanes can be the sum of one (1) or two (2) I/O lanes from each BGA component 212. In some embodiments, the plurality of channels can have a combined bandwidth that is greater than a bandwidth of the interface 232. The combined bandwidth of the plurality of channels having a greater bandwidth than the bandwidth of the interface 232 is beneficial because it allows the interface 232 to utilize its full bandwidth. If the combined bandwidth of the plurality of channels is less than the bandwidth of the interface 232, the interface 232 would only be able to transfer data as quickly as the channels can transfer the data to the interface 232. This could result in the interface transferring data at a speed that is less than its available bandwidth.

In some embodiments, the BGA component controller 216 of each respective one of the BGA components 212 is underneath the plurality of memory blocks 222 of that respective BGA component 212. As shown in FIG. 2, the BGA component controller 216 can be between the plurality of memory blocks 222 and the BGA component interface 214. The BGA component controller 216 can perform memory operations wherein the memory operations on the BGA components 212 comprise compute operations on data stored in the plurality of memory blocks 222 of the BGA components 212.

Figure 3:
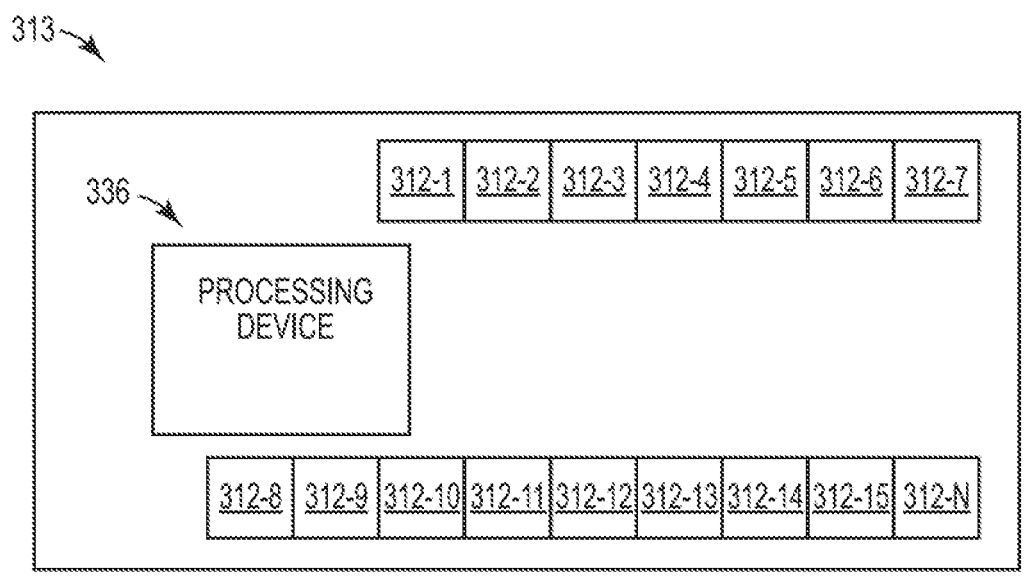
FIG. 3 is another block diagram of an example ball grid array storage for a memory sub-system in accordance with some embodiments of the present disclosure.

FIG. 3 is another block diagram of an example BGA storage for a memory sub-system (e.g., memory sub-system 110) in accordance with some embodiments of the present disclosure. FIG. 3 illustrates a memory component 313 including plurality of BGA components 312-1, 312-2, ..., 312-N (individually or collectively referred to as BGA components 312) and a processing device 336. The processing device 336 can be located in close proximity of the plurality of BGA components 312. Placing the processing device 336 in close proximity to the plurality of BGA components 312 can be beneficial by decreasing the amount of time needed to transfer data between the processing device 336 and any of the plurality of BGA components 312. Decreasing the amount of time needed to transfer data between the processing device 336 and the plurality of BGA components 312 can decrease the amount of time needed to complete memory operations on data sent from the host to the memory component 313.

The amount of BGA components 312 in a memory component 313 can vary. In some embodiments, there can be sixteen (16) BGA components in a memory component 313 and in other embodiments there can be thirty-two (32) BGA components in a memory component 313. Other embodiments can have different amounts of BGA components 312 in a memory component 313. The number of BGA components 312 in a memory component 313, as well as the type of interface in each BGA component 312, can determine the number of I/O lanes used to couple the BGA components 312 to an interface (e.g., interface 232 shown in FIG. 2). For example, if sixty-four (64) BGA components 312 each have a PCIe4 (Fourth generation PCIe) BGA component interface, each BGA component 312 can couple to the interface (e.g., interface 232 in FIG. 2) using two I/O lanes. Therefore, in this example, the BGA components 312 are coupled to the interface using 128 I/O lanes. In other embodiments, if each of 16 BGA component 312 couple to an interface using PCIe5 (fifth generation PCIe) BGA interface, each BGA interface can couple to the interface using one I/O lane. In this embodiment, the BGA components 312 can couple to the interface using 16 I/O lanes.

The number of I/O lanes used to couple the BGA components 312 to the interface can depend on the combined bandwidth of the channels that couple the memory blocks within each BGA component 312 to the interface of each BGA component 312. In some embodiments, it is desirable for the channels coupling memory blocks to the BGA component interface to have a combined bandwidth that is greater than one hundred (100) Gigabytes per second (GB/s). If the memory component interface is a PCIE4 interface, 64 BGA components 312, each with an interface including two I/O lanes, can result in channels with a combined bandwidth of 103 GB/s. However, if the interface is a PCIe5 interface, 32 BGA components 312, each with an interface including one I/O lane, can result in channels with a combined bandwidth of 103 GB/s. Further, if 64 BGA components 312 are coupled to a PCIe5 interface using one I/O lane each, the channels within the BGA components 312 would have a combined bandwidth of 148 GB/s.

Figure 4:
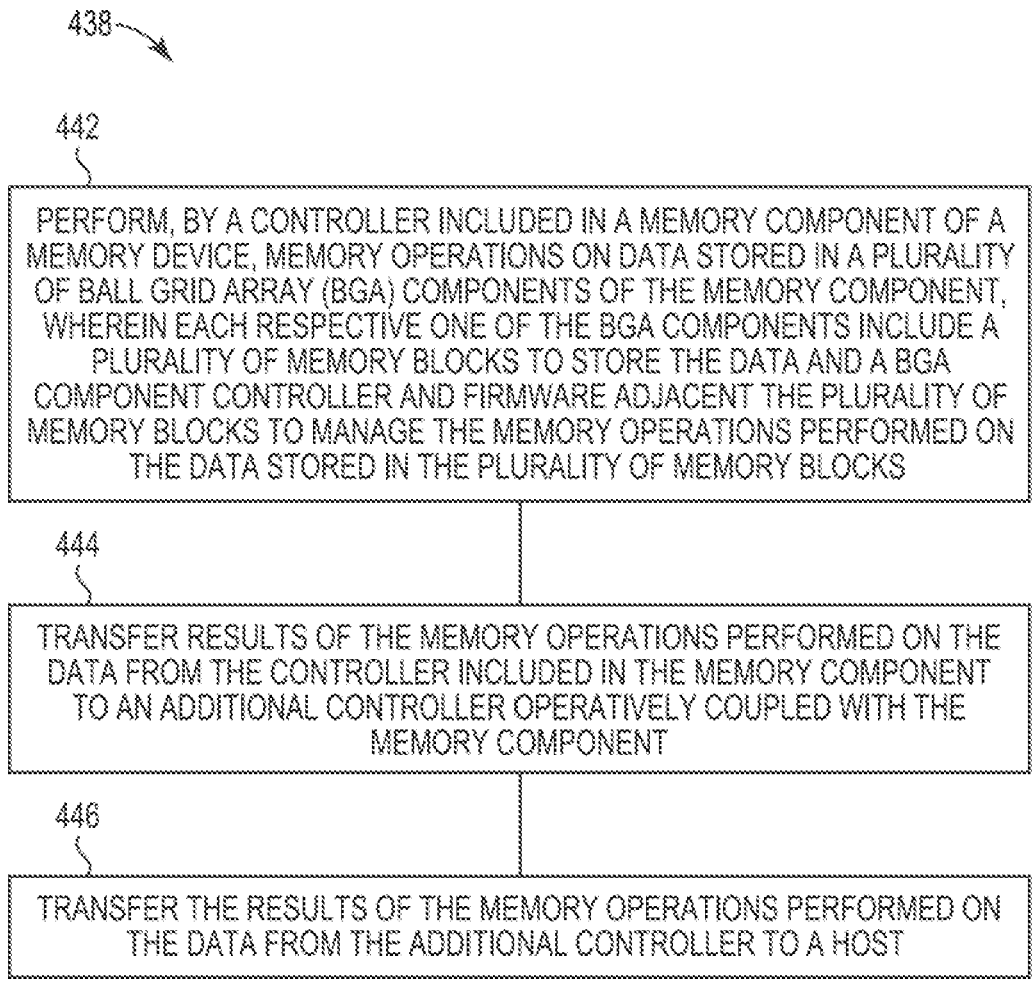
FIG. 4 is a flow diagram of an example method for ball grid array storage for a memory sub-system in accordance with some embodiments of the present disclosure.

FIG. 4 is a flow diagram of an example method 438 for BGA storage for a memory sub-system in accordance with some embodiments of the present disclosure. At operation 442, the method 438 can include performing, by a controller included in a memory component of a memory device, memory operations on data stored in a plurality of BGA components of the memory component, wherein each respective one of the BGA components include a plurality of memory blocks to store the data and a BGA component controller and firmware adjacent the plurality of memory blocks to manage the memory operations performed on the data stored to manage the memory operations performed on the data stored in the plurality of memory blocks. For instance, the controller, memory component, memory device, and BGA components can be controller 136, memory component 113, memory device 130, and BGA components 112, respectively, of FIG. 1. In some embodiments, the controller can allocate memory operations associated with managing the plurality of memory blocks of each respective one of the BGA components to the BGA component controller of that respective BGA component.

At operation 444, the method 438 can include transferring results of the memory operations performed on the data from the controller included in the memory component to an additional controller (e.g., memory sub-system controller 115 shown in FIG. 1) operatively coupled with the memory component. In some embodiments, the results of the memory operations performed on the data stored in each of the BGA components can be transferred from the BGA component controllers to the controller included in the memory component substantially simultaneously. The results of the memory operations performed on the data can be transferred from the BGA components to the controller included in the memory component through a plurality of I/O lanes. In some embodiments, the bandwidth of the I/O lanes between each respective one of the BGA components and the controller can be adjusted. In some embodiments, the bandwidth of the I/O lanes can be adjusted by modifying a number of I/O lanes, modifying a type of I/O lanes, or both. As stated above, each BGA component interface can have one or two I/O lanes and the type I/O lanes can be, at least, PCIe4 or PCIe5 interfaces.

At operation 446, the results of the memory operations performed on the data can be transferred from the additional controller to a host. The results can be transferred via an interface that couples the additional controller to the host. Transferring the results to the host decreases the duration of the data transfer because the results of the memory operations are being transferred to the host instead of the raw data being transferred to the host. Transferring the results of the memory operation to the host instead of transferring the raw data to the host decreases the duration of the data transfer because the results of the memory operation can include less data than the raw data. Transferring less data can result in a decrease in the duration of data transfer. This decrease in the duration of the data transfer can result in a decrease the length of time to complete memory operations within the memory sub-system.

Figure 5:
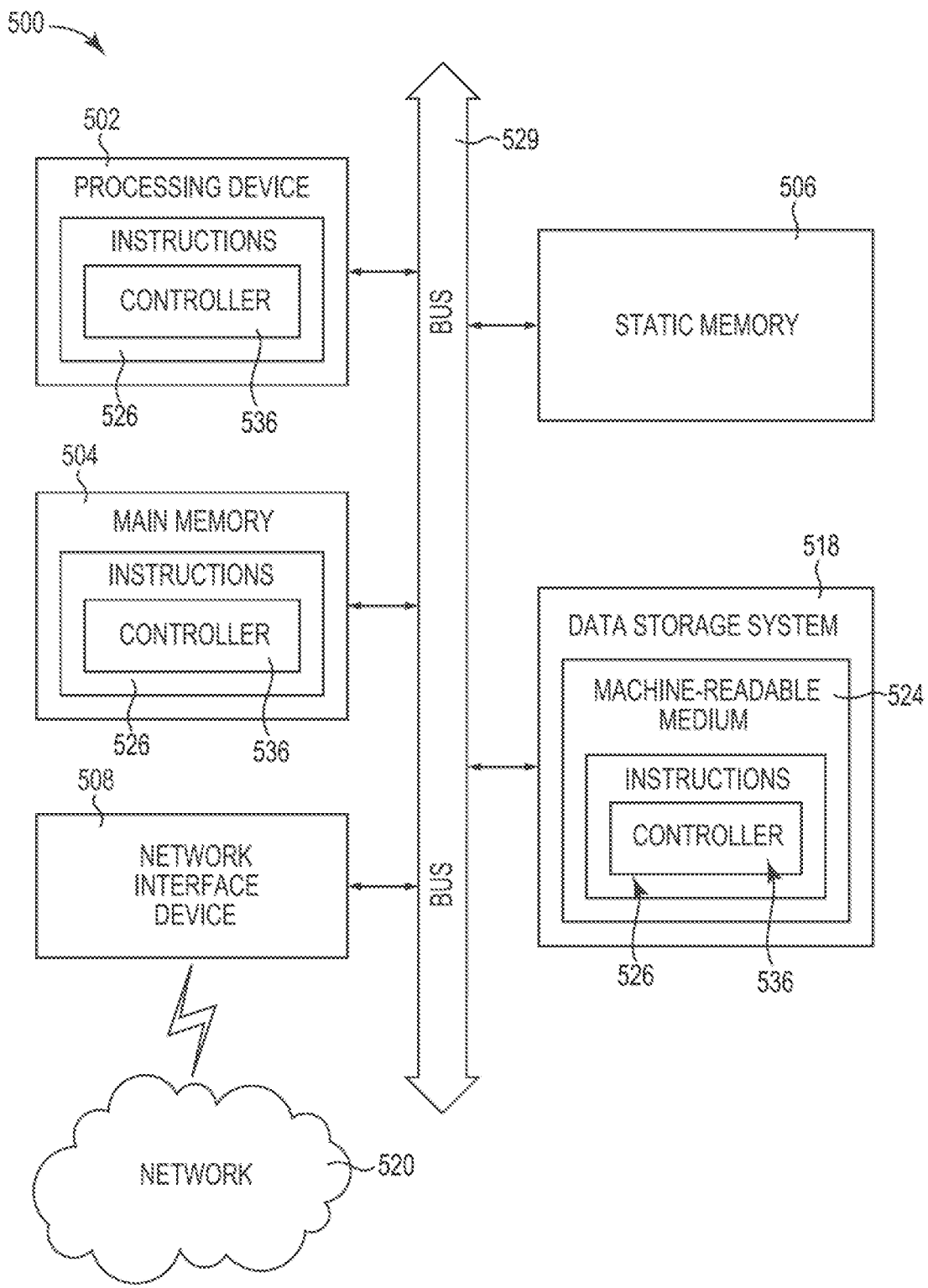
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to controller 536, which can be, for instance, controller 136 of memory component 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
 a ball grid array (BGA) component, wherein the BGA component includes:
  a plurality of memory blocks within the BGA component; and
  a BGA component controller within the BGA component and firmware within the BGA component adjacent the plurality of memory blocks within the BGA component to manage the plurality of memory blocks within the BGA component;
 wherein the BGA component is included in a memory component of the apparatus.

2. The apparatus of claim 1, wherein the apparatus includes a controller coupled to the BGA component and configured to perform memory operations on the BGA component.

3. The apparatus of claim 2, wherein:
 the BGA component is coupled to the controller by a memory component interface; and
 the BGA component includes a plurality of channels to couple the plurality of memory blocks within the BGA component to a BGA component interface.

4. The apparatus of claim 3, wherein a bandwidth of the plurality of channels depends on a type of the memory component interface, a generation of the memory component interface, and a number of input/output (I/O) lanes of the memory component interface.

5. The apparatus of claim 4, wherein the number of I/O lanes is a sum of the I/O lanes that connect the BGA component to the memory component interface and I/O lanes that connect additional BGA components included in the memory component of the apparatus to the memory component interface.

6. The apparatus of claim 4, wherein the number of I/O lanes is one I/O lane or two I/O lanes.

7. The apparatus of claim 4, wherein the number of I/O lanes depends on:
 a number of BGA components in the memory component; and
 a type of the BGA component interface.

8. The apparatus of claim 7, wherein the number of I/O lanes is one I/O lane if the type of the BGA component interface is a fourth generation peripheral component interconnect express (PCIe4) interface.

9. The apparatus of claim 7, wherein the number of I/O lanes is two I/O lanes if the type of the BGA component interface is a fifth generation PCIe (PCIe5) interface.

10. The apparatus of claim 4, wherein the number of I/O lanes depends on the bandwidth of the plurality of channels.

11. The apparatus of claim 1, wherein a first memory block in the plurality of memory blocks within the BGA component has a different storage capacity than a second memory block in the plurality of memory blocks.

12. A method, comprising:
 performing, by a controller included in a memory component of a memory device, memory operations on data stored in a ball grid array (BGA) component included in the memory component of the memory device, wherein the BGA component includes:
  a plurality of memory blocks within the BGA component to store the data; and
  a BGA component controller within the BGA component and firmware within the BGA component adjacent the plurality of memory blocks within the BGA component to manage the memory operations performed on the data stored in the plurality of memory blocks within the BGA component.

13. The method of claim 12, further comprising transferring results of the memory operations performed on the data from the controller included in the memory component to a memory sub-system controller operatively coupled with the memory component.

14. The method of claim 13, further comprising transferring the results of the memory operations performed on the data from the memory sub-system controller to a host.

15. The method of claim 12, further comprising performing, by the controller, memory operations to manage the BGA component on the BGA component.

16. An apparatus, comprising:
 a memory component of the apparatus having a ball grid array (BGA) component, wherein the BGA component includes:
  a plurality of NAND memory blocks within the BGA component; and
  a BGA component controller within the BGA component and firmware within the BGA component adjacent the plurality of NAND memory blocks within the BGA component to manage the plurality of NAND memory blocks within the BGA component.

17. The apparatus of claim 16, wherein the apparatus includes a controller to perform memory operations on the BGA component.

18. The apparatus of claim 17, wherein the memory component includes an interface, wherein the interface comprises a plurality of input/output (I/O) lanes to couple the BGA component to the controller.

19. The apparatus of claim 16, wherein the apparatus includes a memory sub-system controller operatively coupled with the memory component to manage data transferred between a host and the BGA component.

20. The apparatus of claim 16, wherein the BGA component controller is between the plurality of NAND memory blocks and a BGA component interface.

* * * * *